UNITED STATES PATENT OFFICE.

WILLARD E. CASE, OF AUBURN, NEW YORK.

ART OF CONVERTING HEAT ENERGY INTO ELECTRICAL ENERGY.

SPECIFICATION forming part of Letters Patent No. 344,347, dated June 29, 1886.

Application filed October 26, 1885. Serial No. 180,963. (Specimens.)

*To all whom it may concern:*

Be it known that I, WILLARD E. CASE, of Auburn, Cayuga county, New York, have invented a new and useful Improvement in the Art of Converting Heat Energy into Electrical Energy, of which the following is a specification.

My improvement in the art relates to causing a development of chemical energy by and corresponding to the heat energy expended, which chemical energy is transformed into electrical energy.

For practically carrying my improvement into effect, I have invented a new apparatus, the composition and arrangement of the parts of which I have fully described and claimed in another application for Letters Patent filed simultaneously herewith, and serially numbered 180,961. The said apparatus is herein disclaimed.

At the present time heat energy is converted into electrical energy principally either through the medium of the thermopile or through the consumption of fuel, to produce steam or other prime mover which actuates an engine, which in turn actuates a dynamo. My invention differs materially from either of these systems. Its principle may be stated as follows: to cause a direct supply of heat to affect a combination of bodies, liquid and solid, of certain composition, in which combination at normal temperature no chemical reactions occur, by reason of the bringing together of the constituents, and hence which under such conditions will not generate an electrical current, but in which when heat is applied, as aforesaid, chemical energy will be developed and an electrical current be produced. The electrical energy so yielded is within certain limits correlated to the heat supplied, and depends, first, upon the elevation of the liquid to a certain temperature in the presence of the other constituents to a certain degree of temperature, and, second, upon the maintenance of the heat-supply.

The combination of bodies liquid and solid, before referred to, consists in two separate bodies of conducting material and a liquid, the said bodies being immersed in the liquid contained in a suitable vessel. With said bodies are connected circuit-conductors. Normally, at atmospheric temperature substantially no current is yielded—that is to say, no current of any practical moment, nor any save such as is probably unavoidably due to impurities in the materials employed. When heat is applied, however, and is maintained between certain degrees of temperature, the liquid is decomposed and an element thereof is liberated which attacks one of the conducting-bodies. This last then becomes a positive electrode, and the apparatus as a whole is then substantially similar to a galvanic cell, yielding a current in a circuit which includes both conducting-bodies as electrodes and the liquid. As soon as the affinity of the liberated element for the attackable electrode is satisfied, which occurs when the said electrode has become completely combined with the element to form a new substance, no further current is yielded.

Comparing the principle of my invention with the principles of other known means for the production of electricity, it may be recognized that, first, a galvanic battery converts chemical energy into electrical energy; but the chemical energy results from the simple mechanical bringing together of the ingredients of the battery; second, a thermopile converts heat energy into electrical energy, but involves no development of chemical energy; third, a magneto or dynamo electric machine converts mechanical energy into electrical energy, but does not involve development of chemical energy, nor, necessarily, that of heat energy. By my invention heat energy is converted into chemical energy, and chemical energy into electrical energy. The chemical energy generated depends, primarily, upon the heat energy expended, and the electrical energy is therefore correlated to the expenditure of heat energy. My apparatus therefore assumes three states or conditions, which may be distinguished as follows: first, the potential state, which occurs at normal temperature, when the chemical affinities of the ingredients of the liquid are mutually satisfied, no current being yielded; second, the kinetic state, which occurs when heat is applied to raise the temperature of the liquid within certain limits, resulting, as before stated, in chemical energy following the attack of a liberated element upon one electrode; third, the inert state, which occurs when all chemical affinities are satisfied not only in the existing liquid, but between the element liberated therefrom and the electrode which is attacked.

The best means which I now know of carrying my improvement in the art into practical effect is as follows: Into any suitable vessel I place two bodies of conducting material—namely, one of carbon and the other of tin. The tin should be as free from foreign substances as possible. These bodies are immersed in a liquid which consists in a solution of chromic chloride. This is to be done at normal temperature, and the apparatus is now in the above distinguished potential state. Heat is then applied to the liquid and the same is elevated in temperature, but not above 212° Fahrenheit. The two conducting-bodies being connected as electrodes in circuit in the usual way, a current now appears, manifested at a temperature considerably below 212°, but increasing in strength until its maximum is attained, when the liquid is heated to or nearly to 212° Fahrenheit. This temperature should then be maintained as uniformly as possible. So far as I am able to distinguish the effects, the chromic chloride is decomposed into chromium protochloride and free chlorine, and this chlorine attacks the tin, forming tin protochloride so long as the heat is kept up, until all the tin is so converted and the apparatus assumes the above distinguished inert state. The condition of affairs is now substantially in character like that existing in an ordinary zinc carbon-sulphuric-acid-solution cell, when all the zinc has been converted into zinc sulphate.

It is not necessary that the two conducting-bodies should be originally dissimilar—as, for example, carbon and tin—because I may use two carbon electrodes. This, however, involves the employment of a liquid containing chromium protochloride and tin protochloride. Immediately upon mingling these ingredients at normal temperature metallic tin is precipitated and its liberated chlorine combines with the protochloride of chromium, forming chromic chloride. The tin precipitated may be received upon one carbon electrode, so that it becomes substantially a part of said electrode. From the liquid remaining chlorine is liberated by heat as before.

I am well aware that heat has been applied to ordinary galvanic cells for the purpose of producing a constant current of fluid therein, and so diminishing polarization, and in some degree compensating for the lowering of the electro-motive force due to chemical change; but this has nothing in common with my invention. I do not apply heat for the purpose of improving an already existing galvanic cell, but to an apparatus which directly converts that heat into electricity, the said apparatus not being a galvanic cell, except while actually operating as such by reason of the heat supplied to it. So, also, I know that so-called "coke batteries" have been made wherein fused nitrates are brought into contact with carbon, which is consumed at the expense of the oxygen in the nitrate; but here there is actual combustion, burning of the coke in the battery. The coke burns as in air, but simply gets oxygen from another source. Immense volumes of carbonic acid produced attest the great waste of energy and lack of correspondence between the heat expended and the current produced. In my apparatus there are no gases given off, no like combustion, no elevation of temperature to a point anywhere approaching that of burning coke, and no waste of energy, other than that which theoretically and necessarily follows the change from one form to another.

There is one other important feature of my invention, which I do not describe in detail in this application, nor claim it herein, because it is the subject of another application for Letters Patent filed simultaneously herewith and serially numbered 180,962. This is its capability of regeneration. In the coke battery, for instance, when the coke is all consumed, the battery is spent; there is no way of renewing it short of supplying new coke and new nitrate. So, also, in the zinc-carbon battery, there is no way of regenerating the zinc which has become reduced to sulphate. With my apparatus it is possible to regenerate it from the inert to the potential state, as above defined, so that in actual practice the apparatus is hermetically sealed once for all, and yields its current for an indefinite period, (theoretically forever,) except when undergoing regeneration, without any new liquid or conducting-bodies being supplied. The substances contained simply change from one form to another, and the change which results in the chemical energy, which in turn is transformed into electrical energy, is directly caused by, is correlated to, and is practically commensurate with the heat imparted.

I claim—

1. The improvement in the art of converting heat energy into electrical energy, as hereinbefore described, which consists in imparting heat energy to a liquid containing conducting-bodies, and thereby causing a development of chemical and electrical energy.

2. The improvement in the art of converting heat energy into electrical energy, as hereinbefore described, which consists in imparting heat energy to a liquid containing conducting-bodies, and thereby causing a development of chemical energy and electrical energy, the said electrical energy being substantially coextensive with the heat energy imparted.

3. The improvement in the art of converting heat energy into electrical energy, as hereinbefore described, which consists in imparting heat energy to a liquid containing two separate conducting-bodies, and thereby causing a development of chemical energy between said liquid and one of said conducting-bodies corresponding to the heat energy so imparted.

4. The improvement in the art of converting heat energy into electrical energy, which consists, first, in combining a liquid and, immersed therein, separate conducting-bodies, the chemical affinities of the elements of which liquid are mutually satisfied at or below a certain temperature, at which temperature the liquid is substantially without action on the conducting-bodies, and, second, applying heat to said liquid, whereby the same is decomposed and an element thereof liberated, which element chemically reacts on one conducting-body, and so generates an electrical current in a circuit including said conducting-bodies and liquid.

WILLARD E. CASE.

Witnesses:
PARK BENJAMIN,
W. E. DORAN.